United States Patent

Guanella

[15] 3,651,261

[45] Mar. 21, 1972

[54] MESSAGE SCRAMBLING APPARATUS FOR USE IN PULSED SIGNAL TRANSMISSION

[72] Inventor: Gustav Guanella, Zurich, Switzerland

[73] Assignee: Patelhold Patentverwertungs-und Elektro-Holding AG, Glarus, Switzerland

[22] Filed: Aug. 5, 1965

[21] Appl. No.: 477,504

[30] Foreign Application Priority Data

Aug. 6, 1964 Switzerland ........................10308/64

[52] U.S. Cl. ..............................178/22, 179/1.5 S, 307/221, 307/222, 328/63, 328/72, 340/168 B

[51] Int. Cl. ..........................................................H04l 9/02

[58] Field of Search......................325/42, 41, 38, 32, 33, 34, 325/63, 65, 30, 58; 179/1.5, 1.5 R, 15, 53; 178/5.1, 69.5, 88; 328/55, 63, 72, 73, 110, 41, 32, 51, 37, 69, 74, 75; 307/269, 220–221, 224, 231–233, 236, 223, 215, 219

[56] References Cited

UNITED STATES PATENTS

| | | | |
|---|---|---|---|
| 2,696,599 | 12/1954 | Holbrook et al. | 340/168 X |
| 3,040,192 | 6/1962 | Slobodzinski | 307/224 X |
| 3,148,333 | 8/1964 | Simmons | 328/51 X |
| 3,201,515 | 7/1965 | Meisingset et al. | 178/53 |
| 3,067,280 | 12/1962 | Schafley, Jr. | 178/5.1 |
| 3,078,344 | 2/1963 | Crafts et al. | 328/72 X |
| 3,133,991 | 5/1964 | Guanella | 179/1.5 |
| 3,244,808 | 4/1966 | Roberts | 325/42 X |
| 3,289,082 | 11/1966 | Shumate | 325/60 X |
| 3,341,659 | 9/1967 | Stern | 179/1.5 |

*Primary Examiner*—Rodney D. Bennett, Jr.
*Assistant Examiner*—Daniel C. Kaufman
*Attorney*—Green & Durr

[57] ABSTRACT

A pair of binary counters controlled by identical clock pulses are synchronized by means of a plurality of comparison devices in the form of exclusive OR-circuits having their inputs excited each by a pair of signals derived from corresponding stages of said counters and having their outputs connected to the stage of the respective pair to be maintained in phase synchronism with the other stage of said pair. There is maintained as a result thereof an automatic synchronism between the instantaneous states of the counters after a relatively small number of counting operations following an initial out-of-step condition of the counters. In order to synchronize counters located at widely remote stations, such as a pair of counters serving as basic scrambling and unscrambling pulse generators at the transmitter and receiver of secrecy pulse signal transmission system, the instantaneous states of the transmitting counter are reproduced at the receiver by means of a shift register having an equal number of stages to the stages of said counter and being excited by a time-division control pulse series produced by scanning the stages of the transmitting counter at a frequency at least equal to the clock frequency times the number of counter stages, said control pulse series being transmitted from the transmitting to the receiving station through a suitable synchronizing signal channel. In this case, synchronization is effected between the receiving counter and said register replacing the transmitting counter. By the use of an adequate number of counter stages, repetitive patterns in the final scrambling pulse signal, facilitating deciphering by unauthorized persons, may be increased beyond the average message duration.

7 Claims, 5 Drawing Figures

INVENTOR
GUSTAV GUANELLA
BY KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

MESSAGE SCRAMBLING APPARATUS FOR USE IN PULSED SIGNAL TRANSMISSION

The present invention relates to a scrambling apparatus for use in secrecy signal transmission of the type utilizing a message pulse series composed of a succession of binary information signals or "bits" in the form of pulses varying, for instance, between zero and a constant amplitude, such as used in the pulse code transmission of sound or the like signals.

As a rule, in signal transmission of the foregoing type, the scrambling or camouflaging of the information or message being transmitted is effected by a scrambling device or modulator at the transmitting station, to convert the information into an incomprehensible form, and a corresponding unscrambling device or demodulator at the receiving station, to restore the original clear signals or message. In the case of pulsed signal transmission, the scrambling and unscrambling devices are continuously controlled by synchronous control or scrambling pulses so as to, respectively, convert the information into incomprehensible form and to restore the scrambled pulses to their original and clear form or language. The degree of the secrecy obtained is enhanced in proportion as the difficulty to discover any periodicity or repetitive patterns in the control or scrambling pulses is increased. In practice, it is desirable that the recurrent periods or patterns of the pulses be at least as large as the duration of a message, but said periods may advantageously be of greater, such as of the order of hours, days, or even months.

It has already become known, in pulse secrecy transmission of the referred to type, to produce primary scrambling pulses by means of a programmer or primary pulse generator at the transmitting station, said pulses being as far as possible aperiodic and capable of being converted into secondary or final scrambling pulses by means of a scrambling pulse converter in the form of an electronic computer or switching device. If the primary scrambling pulses are transmitted to the receiving station simultaneously with the message pulses scrambled by the final scrambling pulses, they can be directly utilized to control the unscrambling device at the receiving station. In this manner, synchronization may be ensured in a simple manner of the various circuit elements or devices at the transmitting and receiving stations, except at the start of the operation of the scrambling and unscrambling devices upon commencing a message transmission or in the event f a transmission disturbance or interruption. Complex devices and bulky arrangements are required in connection with transmission systems of this type, to ensure a safe co-phasal starting of the scrambling devices, or to restore their synchronism after a service interruption or disturbance.

It has furthermore become known to utilize, in place of a single scrambling pulse generator or programmer referred to in the foregoing, two such generators at both the transmitting and receiving stations together with separate means to continuously maintain the synchronism of said generators. While a frequency synchronism of the latter can be ensured by relatively simple means and over relatively long time periods by the use of sufficiently constant or high-accuracy control clocks or the like timing devices, great difficulties have been experienced in the past to effect a reliable and positive co-phasal starting of the scrambling pulse generators, or to maintain the scrambling and unscrambling devices in close phase synchronism, independently of service interruptions or disturbances.

The present invention is more specifically concerned with pulse type secrecy transmission systems of the latter type, that is, utilizing local control generators for the production of control or clock pulses of constant frequency and serving for the production of identical scrambling and unscrambling pulses at both the transmitting and receiving stations, the invention having for its main object the provision of improved means to maintain the scrambling and unscrambling pulses in close both frequency and phase synchronism, or to substantially instantly effect the co-phasal starting of said pulses at the commencement of a message transmission or after undesirable interruptions of the transmission.

A more specific object of the invention is the provision, in connection with a pulse signal transmission system of the referred to type, of a synchronizing system utilizing a synchronizing pulse series derived from the scrambling pulses at the transmitting station and being transmitted to the receiving station, said pulse series comprising repetitive groups or patterns of a period at least equal to and preferably greater than the duration of a message being transmitted.

Another object of the invention is the provision of a synchronizing system of the referred to type operative upon the deviation from phase synchronism between the scrambling and unscrambling pulses at the transmitter and receiver, respectively, persisting during a predetermined number of pulse intervals, to prevent a synchronizing operation as a result of momentary or relatively short deviations or disturbances.

Yet another object of the invention is the provision of a pulsed signal secrecy transmission system of the type referred to which is both simple in design and construction, as well as efficient and reliable in operation.

The invention, both as the foregoing and ancillary objects as well as novel objects thereof, will be better understood from the following detailed description of a preferred practical embodiment, taken in conjunction with the accompanying drawings forming part of this specification and wherein.

Like reference characters denote like parts and items in the different views of the drawings.

Figure 1:
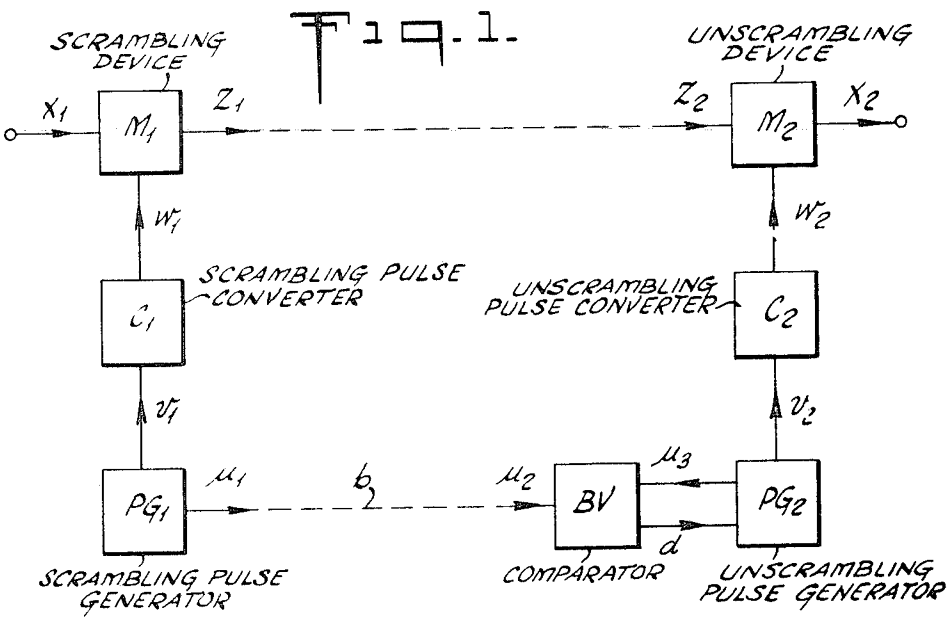
FIG. 1 is a general block diagram of a pulsed secrecy signal transmission system embodying the improvements according to the invention.

With the foregoing objects in view, the invention, according to one of its aspects, involves generally the provision, in conjunction with a pulse type secrecy signal transmission system of the referred to type, of identical scrambling pulse generators disposed at both the transmitting and receiving stations and controlled by identical and highly stable control or timing pulse generators, to ensure a close frequency synchronism between the scrambling and unscrambling pulses, respectively, of control means to effect a co-phasal starting of said generators at the commencement of a signal transmission or pursuant to a disturbance or interruption of the transmission persisting over a predetermined time period or number of pulse periods or intervals. There is provided for this purpose, in accordance with the improvements of the present invention, means at the transmitting station to transmit a control pulse series derived from the scrambling pulse generator to the receiving station via a separate transmission channel, and further means at the receiving station to compare the received control pulses with the locally generated pulses, to thereby produce a correcting signal or pulse in the event of a deviation or discrepancy between the instantaneous states of the received and local pulses being compared, said correcting signal being adapted to control the local scrambling pulse generator at the receiving station in a manner as to restore the phase synchronism thereof with the scrambling pulse generator at the transmitting station.

According to a preferred embodiment of the invention designed to produce scrambling or control pulses having a relatively long repetition period or periodicity, the scrambling pulse generators at the transmitting and receiving stations consist of binary counters having a predetermined number of counting stages and being controlled by identical highly stable clock or timing pulse generators, whereby to maintain a close frequency synchronism between said counters and, in turn, between the scrambling and unscrambling pulses, respectively. Primary scrambling and unscrambling pulses derived from all the counter stages, either simultaneously or sequentially, are advantageously applied to additional scrambling pulse converts in the form of electronic computers, to produce final scrambling and unscrambling pulses, respectively. At the same time, a control pulse series derived from the counter at the transmitting station and transmitted to design, to produce a scrambled signal $z_1$ which is transmitted to the receiving station through a suitable transmission channel or link $a$, the received signals $z_2$ being, in turn, unscrambled by the unscrambling device or demodulator $M_2$, to produce the original unscrambled clear signal or message $x_2$. Devices $M_1$ and $M_2$ are of identical construction, as is well known and understood. The final scrambling and unscrambling pulses or series $w_1$ and $w_2$, being as a rule identical with one another, are produced the one at the transmitting station and the other at the receiving station, to control the scrambling and unscrambling modulators $M_1$ and $M_2$, respectively. Each station furthermore includes a scrambling pulse generator or programmer $PG_1$ and $PG_2$, respectively, serving to produce identical primary scrambling pulses or pulse groups $v_1$ and $v_2$, respectively. In order to improve the secrecy of the transmission, scrambling pulse converts $C_1$ and $C_2$ in the form of electronic computers or switching devices are interposed between the generators $PG_1$ and $PG_2$ and the respective modulators $M_1$ and $M_2$, to convert the primary scrambling pulses $v_1$ and $v_2$ into the secondary or final scrambling pulses $w_1$ and $w_2$, in the manner known and shown for instance by applicant's U.S. Pat. No. 3,077,518 and copending patent application Ser. No. 339,953, filed Jan. 24, 1964, of which the present applicant is joint inventor.

According to the present invention, the scrambling pulse generator $PG_1$ at the transmitting station transmits, simultaneously with the message transmission from $M_1$ to $M_2$ through the link $a$, a pulse group or pulses $u_1$ over a separate channel $b$ to the receiving station where the pulses are received, as a rule, as separate pulses or groups $u_2$ and applied to a comparator BV. The latter serves to compare the received pulses $u_2$ with the similarly generated local pulses $u_3$ derived from the scrambling pulse the receiving station serves to control thereat a pulse shift register having the same number of stages as said counters, in such a manner as to cause the momentary positions of or numbers stored by the counter at the transmitting station, on the one hand, and by said register, on the other hand, to coincide such as to afford a comparison of the respective stages of the counter and register and to produce a correcting signal or pulse in the event of a discrepancy in the states of the stages being compared, said correcting signal, in turn, acting to substantially instantly reverse the state of the respective counter stage, at the receiving station, to thereby restore the phase synchronism with the register and, in turn, with the counter at the transmitting station.

The use of binary counters as scrambling pulse generators has the advantage of enabling the achievement of extremely long recurrent pulse periods or patterns in the interest of improving the secrecy obtained by a system of the type according to the invention.

In order to prevent operation of the synchronism control in the event of momentary errors, or error pulses persisting over a limited number of pulse periods or intervals only, suitable limiting means may be provided operative to start the synchronism control only upon the occurrence of a predetermined number of successive error or correcting pulses, in the manner as will become further apparent as the following description proceeds in reference to the drawings.

Referring more particularly to FIG. 1, $x_1$ denotes a message pulse series at the transmitting station (pulse code modulated sound or the like signals), while $x_2$ denotes the reconstituted pulse series at the receiver after scrambling and unscrambling, respectively. Scrambling of $x_1$ is effected in a known manner by the scrambling device or modulator $M_1$ of known generator $PG_2$ at the receiving station, to produce, in the event of a discrepancy between the instantaneous states or values (zero and maximum amplitude) of the signals or pulses $u_2$ and $u_3$, a correcting signal d being applied to the generator $PG_2$ and acting to substantially instantly restore the phase synchronism between the generators $PG_1$ and $PG_2$ and, in turn, between the scrambling pulses $w_1$ and $w_2$, respectively.

Figure 2:
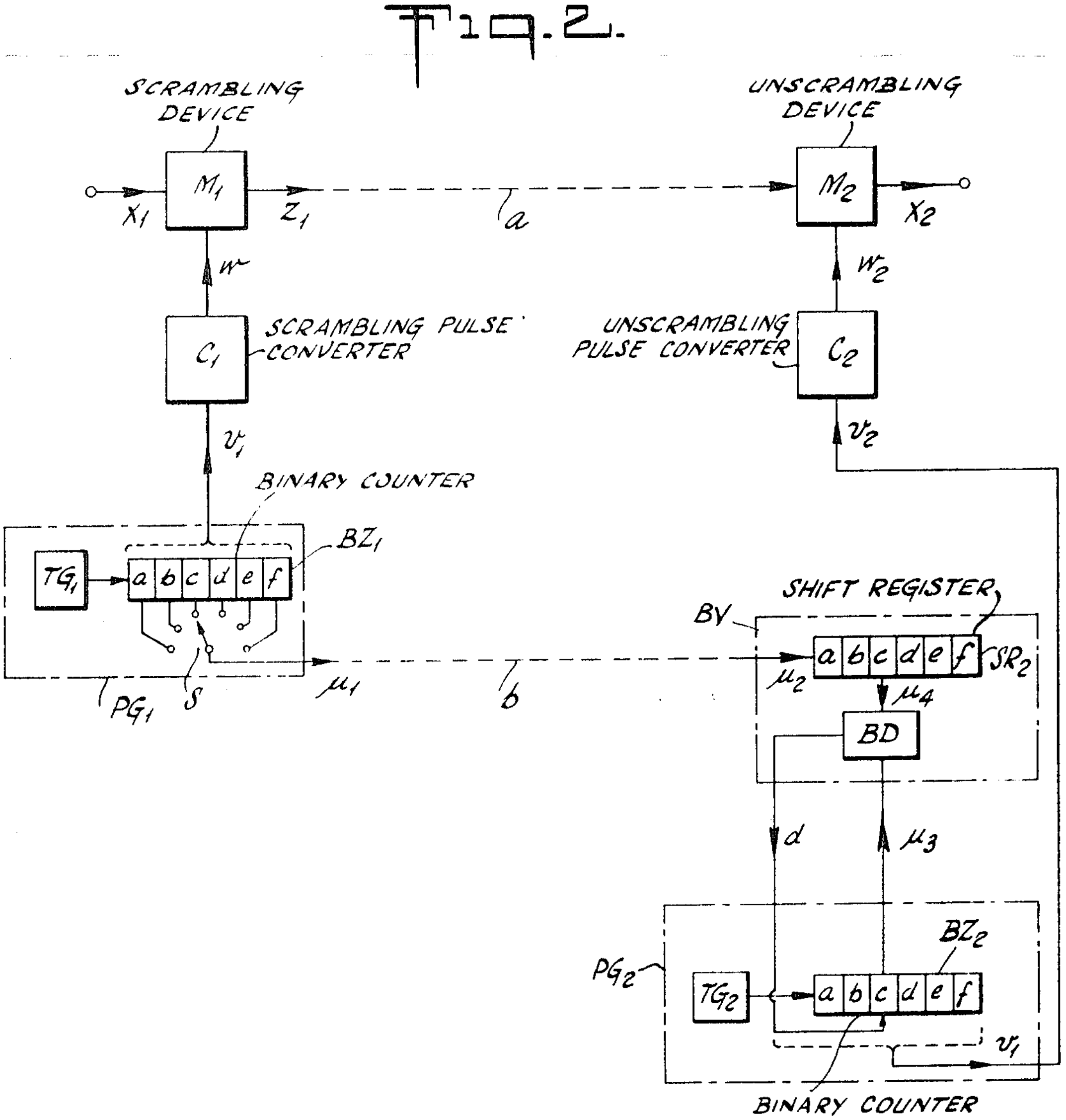
FIG. 2 is a more detailed block diagram showing a preferred embodiment of the invention.

Referring to FIG. 2, the scrambling pulse generators $PG_1$ and $PG_2$ advantageously take the form of binary counters $BZ_1$ and $BZ_2$ having a predetermined number of cascade-connected binary or flip-flop stages (six stages $a$–$f$ being shown in the drawing) and having their inputs excited by separate control or timing (clock) pulse generators $TG_1$ and $TG_2$, respectively, of sufficient accuracy, or stability to ensure a frequency synchronism of the input pulses applied to the counters $BZ_1$ and $BZ_2$. The outputs of the separate counter stages $a$–$f$ (primary scrambling signals $v_1$ and $v_2$) each may be applied to separate inputs of the respective converters or computers $C_1$ and $C_2$ as shown in FIG. 5 of U.S. Pat. No. 3,077,518, or the outputs $a$–$f$ of the counters may be scanned successively in synchronism with the clock pulse frequency and combined, to provide a single input pulse series applied to the inputs of the computers $C_1$ and $C_2$ for additional scrambling, such as by the aid of a regenerative scrambling arrangement as shown in the referred to copending application. In general, the primary scrambling pulses $v_1$ and $v_2$ may be derived from the programmers $PG_1$ and $PG_2$, or counters $BZ_1$ and $BZ_2$, in any suitable manner, provided only that the pulses $v_1$ are normally identical to the pulses $v_2$, the way of derivation and production of the final scrambling pulses $w_1$ and $w_2$ from the generators $PG_1$ and $PG_2$ being immaterial as far as the present invention is concerned which relates specifically to the synchronization of the primary scrambling pulses $v_1$ with the pulses $v_2$.

In order, in accordance with the present invention, to afford a comparison of the instantaneous states (zero or maximum amplitude) of corresponding stages of the counters $BZ_1$ and $BZ_2$, or of the instantaneous numbers stored by said counters, respectively, the pulse signals $u_2$ upon arriving at the receiver are applied to the input of a shift register $SR_2$ of known construction having an equal number of storage or flip-flop stages as the counters $BZ_1$ and $BZ_2$, said register having all its stages furthermore excited in a known manner by a series of shifting or trigger pulses (not shown) in synchronism with the clock or applied signal pulse frequency. In order to cause the instantaneous states of the stages $a$–$f$ or number stored by the register to coincide with the instantaneous number of the counter $BZ_1$, the pulses $u_1$ are derived from the stages $a$–$f$ of said counter through a synchronous switch S consecutively scanning said stages at a frequency equal to the clock pulse frequency times the number of counter stages (six stages in the example shown by the drawing), in such a manner as to result in the same instantaneous binary numbers being stored by the stages $a$–$f$ of both the counter $BZ_1$, on the one hand, and the register $SR_2$, on the other hand, as well as of the counter $BZ_2$ in the event that $v_1$ and $v_2$ are in exact phase synchronism with one another.

In FIG. 2 the shift register $SR_2$ together with a suitable binary state comparison device $BD^2$, such as a binary differentiator for comparing the output pulse signals $u_4$ and $u_3$ of corresponding stages of the register $SR_2$ and counter $BZ_2$ and production of the synchronizing or correcting signal $d$, form the comparator BV of the preceding figure. In the drawing, only a single comparison device BD is shown connected to the stages $c$ of the register $SR_2$ and counter $BZ_2$, it being understood that similar comparison and correcting devices may be connected to the remaining pairs of coordinated register and counter stages. Alternatively, a single comparator or corrector may be used with means (not shown) to successively connect the same to the respective stages, to successively scan the coordinated counter and register stages and to correct the counter $BZ_2$ to restore its synchronism with the counter $BZ_1$, in the manner as will become more apparent as the description proceeds.

In the following will be described the operation of the comparator BD and function of the synchronizing signal $d$, special reference being had to FIGS. 3A, 3B and 4 of the drawings.

Figure 3A:
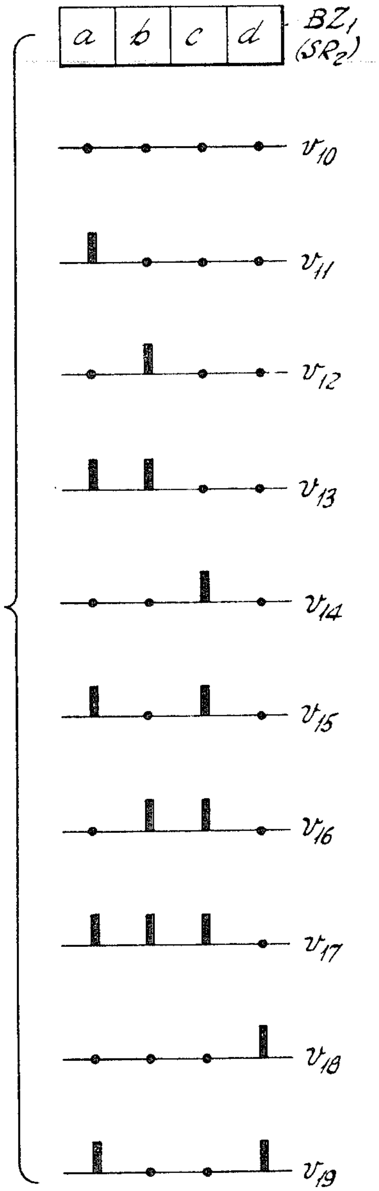
FIGS. 3A and 3B are explanatory diagrams illustrative of the function and operation of the synchronism control in FIG. 2.

Each stage of a binary counter may assume principally two states, as shown for a four-stage counter $BZ_1$, FIG. 3A, having stages *a*, *b*, *c* and *d* and successive positions $v_{10}$, $v_{11}$, $v_{12}$, etc., with the points denoting a first binary state (zero amplitude or absence of a pulse) and with the bars denoting the second binary state (maximum amplitude or presence of a pulse). Each time a clock or timing pulse is applied to the first or input stage *a* of the counter $BZ_1$, the state of this stage is reversed, this resulting in turn in a progressive change of the states of the remaining stages *b*, *c* and *d* in accordance with the rules of the binary notation or counting system. More particularly, the state of the stage *b* changes each time the preceding stage *a* changes from a bar to a point, as exemplified by the transitions from $v_{11} - v_{12}$, $v_{13} - v_{14}$, $v_{15} - V_{16}$ and $v_{17} - v_{18}$. Furthermore, the state of the stage *c* changes when the two preceding stages *a* and *b* form a bar, as exemplified by the transitions from $v_{13} - v_{14}$ and $v_{17} - v_{18}$, while stage *d* changes only when all the preceding stages form a bar in the example shown, as indicated by the transition from $v_{17} - v_{18}$. Simultaneously with each of the aforementioned changes of stages *b*, *c* and *d*, all the preceding stages change from a bar to a point, as shown for instance at $v_{18}$, while the succeeding stages vary in the manner set forth and each of the incoming timing or control pulses produce new changes in the input stages in accordance with the rules of binary notation or counting. The same changes of the counter $BZ_1$ also apply to the register $SR_2$ exhibiting the same numbers stored in said counter, as pointed out.

A binary counter having four stages has a total of 16 combinations of states, while with a six-stage counter as shown by the drawing exhibits altogether 64 combinations of counter states.

Figure 3B:
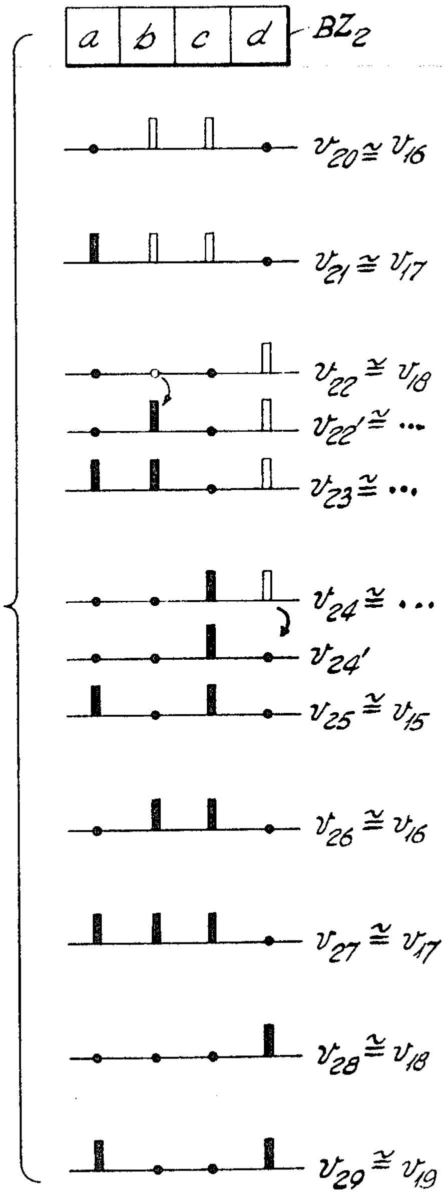

Referring now to FIG. 3B, there are shown the states of the stages *a–d* of the binary counter $BZ_2$, again assuming a four-stage counter in place of the six-stage counter shown in FIG. 2. In the case of perfect phase synchronism between the counter $BZ_1$ (or shift register $SR_2$) and $BZ_2$, the states of the counters should be alike in all successive positions, that is, the pattern according to FIG. 3B should be identical to that of FIG. 3A.

Let it be assumed that, as a result of a transmission disturbance or interruption, the momentary positions of $BZ_2$ no longer coincide with those of $BZ_1$ and, in turn, of the register $SR_2$, respectively. Such a discrepancy obtains ordinarily at the starting of the transmitting and receiving devices for the transmission of a scrambled message. Let it be assumed, as shown in FIG. 3B, that the stages of the counter $BZ_2$ at the instant of starting the transmission are in a position as denoted at $v_{20}$, that is, that stages *b* and *c* form a bar in place of the points of the corresponding stages of $BZ_1$. In other words, the counter $BZ_2$ is assumed to be in a position $v_{20}$ corresponding to the position $v_{16}$ of the counter $BZ_1$ or register $RS_2$, respectively. These deviations between the stages *b* and *c* are registered by the comparison device or devices BD, FIG. 4, said devices being a advantageously designed in such a manner as to produce a correcting signal or pulse *d* if the deviations persist during a desired number of counter positions or pulse periods say three such periods as assumed in the example illustrated in the drawing. In the latter case, the resultant signal *d* acts to change or reverse the state of the corresponding stage of the counter $BZ_2$, to thereby correct the error or deviation from exact phase synchronism between the counters. In the example of FIG. 3B, the correcting operation will occur after the third error pulse, that is, at the position $v_{22}$ of $BZ_2$ corresponding to the position $v_{18}$ of $BZ_1$. During the three positions $v_{20} - v_{22}$, the comparison device registers a deviation from the corresponding positions $v_{10} - v_{12}$ (the "wrong" states being represented by open circles and bars in place of the solid bars and circles representing the "should-be" states), whereby the resultant correcting pulse *d* acts to instantly reverse the state of stage *b* of the counter $BZ_2$, as indicated by the intermediate position $v_{22}'$.

In the meantime, stage *c* has been restored to its correct position in accordance with the basic operation of the binary counter, but has transferred the error upon the next following stage *d* as a result of the same operation. The error, upon appearing three times in positions $v_{22} - v_{24}$ of stage *d*, in turn results in the application of a further correcting pulse *d* by the comparison device BD to the stage *d* of counter $BZ_2$. This intermediate position is shown at $v_{24}'$, whereby to restore stage *d* to its correct position and to cause both counters $BZ_1$ and $BZ_2$ to be in exact phase synchronism with one another, as indicated by the subsequent positions $v_{26} - v_{29}$ in FIG. 3B.

While the foregoing analysis has been presented in reference to a pair of four-stage binary counters, for the sake of clarity and simplicity of illustration, the same results are obtained with a six-stage counter, as shown by the drawings, or counters having any desired number of stages, as will be readily understood.

Figure 4:
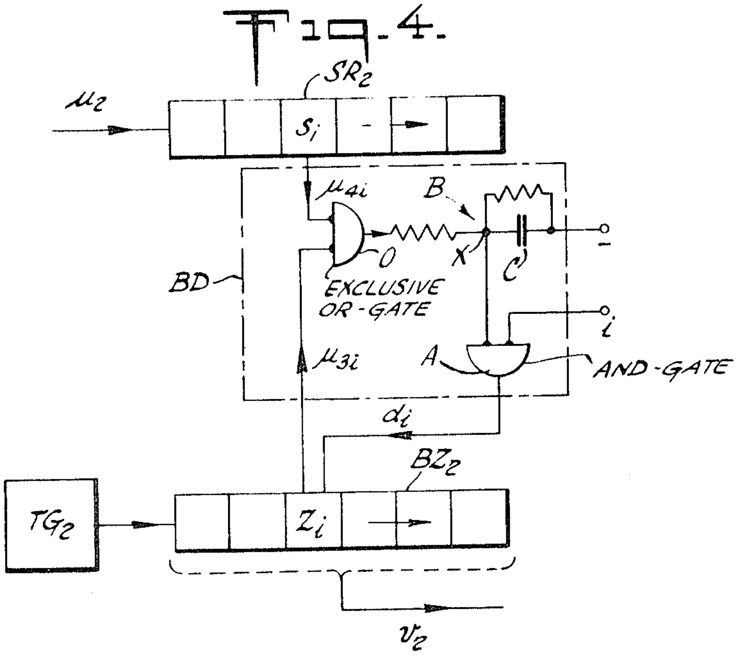
FIG. 4 is a partial diagram, showing in greater detail the formation and function of the synchronism control signal in FIG. 2.

FIG. 4 more clearly shows a practical example of the comparator BD and means of applying the correcting or synchronizing pulses d to the counter $BZ_2$. The comparison of the pulses $u_{4i}$ and $u_{3i}$, derived from a pair of coordinated register and counter stages $S_i$ and $Z_i$, respectively, is effected by means of an EITHER-OR or exclusive OR-gate or circuit 0, that is, a circuit producing an output if both inputs differ, that is, if either of the inputs is a pulse, but producing no output if both inputs are pulses. In other words, an output pulse $c_i$ will be produced by the OR-gate in the case of a discrepancy between the states of the stages $S_i$ and $Z_i$ being compared, while zero output obtains in the case of equality of the states of said stages, or in the case of synchronism between the counters. The output pulses $c_i$ are applied, in the example shown, to the capacitor C of a smoothing filter or summation circuit B, to increase the capacitor voltage, upon the occurrence of three or more error pulses, to a value sufficient to excite and operate an AND-gate A supplying the output or correcting pulses $d_i$ applied to stage $Z_i$ of counter $BZ_2$. In order to ensure a close and stable control, a pulse voltage *i* of predetermined amplitude is applied to the remaining input of the AND-gate, whereby with the voltage *i* coinciding, for instance, with three times the amplitude of $c_i$ at the point *x*, a correcting pulse, $d_i$ is produced, to restore the synchronism in the manner described.

There is prevented in this manner a condition where every minor momentary random disturbance would initiate the operation of the synchronizing devices, whereby the latter act to correct synchronizing errors persisting over predetermined, preferably adjustable, time periods only. As is understood, in comparing the counter and shift register stages in succession, care must be taken to ensure that the changeover or switching operations do not effect the other stages of the counter or register.

As previously mentioned, separate comparison circuits may be operatively connected in the manner shown with each of the corresponding stages of the register $SR_2$ and counter $BZ_2$, or a single comparison circuit may be provided to successively scan the corresponding register and counter stages at an appropriate scanning speed or frequency.

The information scrambling arrangement as described in the foregoing continues to operate normally for a sufficient time period in the event of interruptions or brief gaps in the transmission of the information and/or of the pulse groups or series $u_1$ and $u_2$, respectively. The correcting system ensures that starting occurs substantially instantly or after a short time so that unscrambling may proceed correctly. The advantage of using binary counters having a limited number of counting stages as scrambling pulse generators is due to the fact that an extremely high periodicity of the derived pulse groups or series may be achieved with consequent improvement in secrecy. While the four stage counter assumed according to FIGS. 3A and 3B has 16 momentary positions or counting numbers, the periodicity may be increased by an increase of the number of the counting stages and/or by a periodic suppression of discrete pulses supplied by the control generators $TG_1$ and $TG_2$, to obtain derived aperiodic pulse series or groups at least as far as the duration of an information transmission is concerned.

The periodicity of the successive positions of or numbers exhibited by the counters $BZ_1$ and $BZ_2$ may further be increased by the provision of feedback paths connecting one or more counter stages with predetermined preceding stages of the counters directly or through suitable logic circuits.

In the foregoing the invention has been described in reference to a specific illustrative device or system. It will be evident, however, that variations and modifications, as well as the substitution of equivalent parts or elements for those shown for illustration, may be made without departing from the broader purview and spirit of the invention as set forth in the appended claims. The specification and drawings are accordingly to be regarded in an illustrative rather than in a restrictive sense.

I claim:

1. The combination with a pulse signal transmission system including a transmitting station, a receiving station and means to transmit an information pulse series from said transmitting station to said receiving station, the information transmitted being characterized by varying binary states zero-maximum, etc.) of the consecutive pulses of said series, of information scrambling means comprising in combination:

1. a first scrambling pulse generator at said transmitting station including a first clock pulse generator, a first binary counter having a predetermined number of counting stages, and means to control the input of said counter by said generator,
2. a scrambling modulator controlled by a first scrambling pulse series derived from predetermined output stages of said counter, to scramble an information pulse series being transmitted,
3. a second scrambling pulse generator at said receiving station including a second clock pulse generator identical to said first clock pulse generator, a second binary counter identical to said first counter, and means to control the input of said second counter by said clock pulse generator,
4. an unscrambling modulator controlled by a second scrambling pulse series derived from said second counter and identical to said first scrambling pulse series, to unscramble the information pulse series received at said receiving station, and
5. means to maintain said first and second counters in rigid phase synchronism with one another comprising
   a. a pulse shift register at said receiving station having a number of stages equal to the number of stages of said counters,
   b. means to successively and periodically scan the stages of said first counter at a frequency at least equal to the frequency of said clock pulse generators times the number of counter stages, to produce a control pulse series,
   c. means to transmit said control pulse series from said transmitting station to said receiving station, to control said register, whereby to cause the instantaneous states of the register stages to coincide with the states of the corresponding stages of said first counter
   d. a plurality of pulse comparison means at said receiving station each having a pair of inputs with means to excite the same by a pair of corresponding stages of said register and said second counter, respectively, and an output, to produce correcting pulses upon the occurrence of a discrepancy between the states of the respective register and counter stages, and
   e. means to reverse the states of the stages of said second counter by said correcting pulses.

2. In a pulse type signal transmission system as claimed in claim 1, including identical electronic switching devices interposed respectively between said first and second counters and said scrambling and unscrambling modulators, to improve the secrecy of the information transmitted.

3. In a pulse type signal transmission system as claimed in claim 1, each of, said comparison means consisting of an exclusive OR-circuit having a pair of inputs connected to the corresponding stages of said register and said second counter and having its output connected to the respective stage of said second counter.

4. In a pulse type signal transmission system as claimed in claim 3, including summation and limiting means connected between the output of said OR-circuit and said second counter, to cause said correcting pulses to become effective in controlling said second counter upon the occurrence of a predetermined number of consecutive discrepancies between the states of corresponding stages of said register and said second counter.

5. A binary counter synchronizing system comprising in combination:

1. a first binary counter located at a first point and having a predetermined number of counting stages,
2. a second binary counter identical to said first counter and located at a second point remote from said first point,
3. identical clock pulse generators controlling said counters, and
4. means to maintain said counters in rigid phase synchronism with one another comprising
   a. a pulse shift register at said second point having a number of stages equal to the number of stages of said counters,
   b. means to successively and periodically scan the stages of said first counter at a frequency at least equal to the frequency of said clock pulse generators times the number of counter stages, to produce a control pulse series,
   c. means to transmit said control pulse series from said first point to said second point, to control said register, whereby to cause the instantaneous states of the register stages to coincide with the states of the corresponding stages of said first counter,
   d. a plurality of pulse comparison means at said second point each having a pair of inputs with means to excite the same by a pair of corresponding stages of said register and said second counter and having an output, to produce correcting pulses upon the occurrence of a discrepancy between the corresponding states of said register and second counter, and
   e. means to reverse the stages of said second counter by and upon the occurrence of a correcting pulse.

6. In a binary counter synchronization system as claimed in claim 5, each of said comparison means consisting of an exclusive OR-circuit having a pair of inputs connected to the corresponding stages of said register and said second counter and having an output connected to the respective stage of said second counter.

7. A binary counter synchronization system comprising in combination:

1. a first binary counter having a predetermined number of counting stages,
2. a second binary counter identical to said first counter,
3. identical clock pulse generators controlling said counters, and
4. means to maintain said counters in rigid phase synchronism comprising
   a. a plurality of exclusive OR-circuits each having a pair of inputs with means to excite the same by signals derived from a pair of corresponding stages of said counters and having an output, to produce correcting pulses upon the occurrence of a discrepancy between the states of the respective counter stages, and
   b. means to reverse the states of the stages of said second counter by and upon the occurrence of a correcting pulse.

* * * * *